(12) United States Patent
Zabokritski

(10) Patent No.: US 7,962,904 B2
(45) Date of Patent: Jun. 14, 2011

(54) DYNAMIC PARSER

(75) Inventor: Evgueni Zabokritski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 11/746,717

(22) Filed: May 10, 2007

(65) Prior Publication Data

US 2008/0281580 A1    Nov. 13, 2008

(51) Int. Cl.
*G06F 9/45* (2006.01)
(52) U.S. Cl. ........................................ 717/143
(58) Field of Classification Search .................. None
See application file for complete search history.

(56) References Cited

U.S. PATENT DOCUMENTS

| | | | |
|---|---|---|---|
| 5,105,353 | A | 4/1992 | Charles et al. |
| 5,276,880 | A | 1/1994 | Platoff et al. |
| 5,903,756 | A | 5/1999 | Sankar |
| 5,999,948 | A | 12/1999 | Nelson et al. |
| 6,523,172 | B1 | 2/2003 | Martinez-Guerra et al. |
| 6,845,373 | B2 | 1/2005 | Linhart |
| 7,089,541 | B2 | 8/2006 | Ungar |
| 2003/0106049 | A1* | 6/2003 | Ungar .................. 717/143 |
| 2003/0145282 | A1 | 7/2003 | Thomas et al. |
| 2003/0185220 | A1* | 10/2003 | Valenci .................. 370/398 |
| 2004/0225999 | A1 | 11/2004 | Nuss |
| 2007/0022414 | A1 | 1/2007 | Bird |
| 2008/0235601 | A1* | 9/2008 | Fried et al. .................. 715/760 |

OTHER PUBLICATIONS

Lawrence Paulson. A Semantics-Directed Compiler Generator. http://delivery.acm.org/10.1145/590000/582178/p224-paulson. pdf?key1=582178&key2=6629290711&coll=GUIDE&dl= GUIDE&CFID=13863670&CFTOKEN=66839018. Last accessed Feb. 9, 2007. pp. 224-233.
Manuel Vilares Ferro, et al. Dynamic Programming as Frame for Efficient Parsing. http://csdl2.computer.org/persagen/DLAbsToc.jsp?resourcePath=/dl/proceedings/&toc=comp/proceedings/sccc/1998/8616/00/8616toc.xml&DOI=10.1109/SCCC.1998.730784. Last accessed Feb. 9, 2007.
Wiktor Macura. A Survey of Compiler-Compilers. May 25, 2005. http://userpages.umbc.edu/~wmacur1/cc_survey.pdf.

* cited by examiner

*Primary Examiner* — Philip Wang
(74) *Attorney, Agent, or Firm* — Workman Nydegger

(57) ABSTRACT

The subject disclosure pertains to systems and methods for dynamic parsing. A dynamic parser can perform syntactic analysis or parsing of input data consisting of a set of tokens based upon a provided grammar including conditional tokens. While the parser grammar can be fixed, the dynamic parser can utilize an independent transform function at parse time to translate or replace particular tokens, effectively performing dynamic parsing. The transform function can be utilized in conjunction with conditional tokens to selectively activate and deactivate particular grammar rules. Additionally, systems and methods for automatically generating a dynamic parser from a grammar description are described herein.

8 Claims, 11 Drawing Sheets

DYNAMIC PARSER

BACKGROUND

Computers and computer software have become nearly ubiquitous throughout society. Virtually every business utilizes commercial or custom software for tasks such as managing inventory, billing, document preparation, product design and/or production and the like. Similarly, educational institutions and nonprofit organizations utilize software for research, word-processing and other processes. Larges numbers of individuals also utilizes computers and computer software for diverse tasks such as preparation of tax returns, research, directions and the like. As computer-related hardware continues to develop, uses for computer software continue to grow, leading to the development of additional software programs and data.

Syntactic analyzers or parsers are commonly used to analyze data and/or compile software code. In particular, software developers create programs using artificial programming languages (e.g., Basic, C, C++, structured query language (SQL) and the like). Software programs are translated or compiled from such programming languages into a machine-readable format that a computer or processor can execute. Compilation can be broken down into a number of steps. Typically, programming code is first parsed. During parsing, the file containing the text of the software code analyzed to generate a parse tree. Moreover, parsers can identify syntactic errors in software code and alert programmers to such errors. After parsing, the resulting parse tree is further processed by a compiler that generates executable code. Parsers can be used to analyze text input based upon a grammar or set of rules.

Over time languages continue to evolve, frequently adding features and increasing flexibility. As languages change, parsers associated with the language also change to accept the new grammar and develop the correct parse tree. Parsers are frequently created automatically using parser generator tools such as YACC (yet another compiler compiler). A set of grammar rules can serve as a seed for a parser generator, which can output a parser that functions in accordance with the provided grammar.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns syntactic analysis or parsing of input tokens with respect to a specific grammar. In general, an automated parser utilizes a fixed grammar for analysis of tokens. Typically, once the parser is created, the parser remains static, performing fixed analysis in accordance with the grammar. Due to the general lack of flexibility of parsers, even minor changes can require complete recreation of the parser. Moreover, it can be difficult to create a parser capable of supporting multiple versions and providing for backward compatibility.

The systems and methods described herein are directed to dynamic parsing utilizing conditional tokens. Grammar associated with a parser can include declarations of conditional tokens, such that particular tokens can be transformed or replaced by other tokens depending upon token context. Transformation can be managed by invoking an independent transform function at parse time. Consequently, the grammar can remain static, ensuring consistency, while the transformation allows for selection of particular grammar rules at parse time, effectively providing dynamic parsing of input tokens.

In addition, systems and methods for automated generation of dynamic parsers are described herein. During parser generation, a formal grammar including conditional token declarations can be evaluated for consistency. Conflicts or errors can be identified and reported to ensure parser consistency. Based upon the grammar evaluation, a dynamic parser can be created. The dynamic parser can be capable of utilizing an independent transform function provided at parse time to perform conditional transformation or translation of selected tokens.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
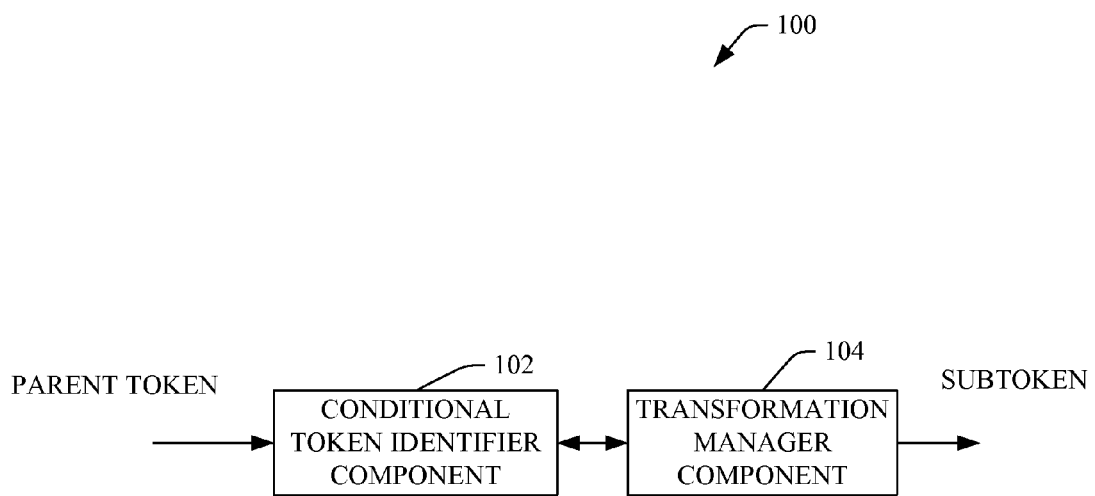
FIG. 1 is a block diagram of a system that processes conditional tokens in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips ...), optical disks (e.g., compact disk (CD), digital versatile disk (DVD) ...), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Parsing or syntax analysis is the process of evaluating a series of tokens with respect to a particular grammar or set of syntactic rules. Parsers generally analyze an input document and determine if the document conforms to the grammar on which the parser is based. For example, a parser for the C programming language can determine whether a piece of C software code conforms to the rules of the C programming language. If the software code follows the grammar, the parser can generates a representation of the code (e.g., a parse tree) for further compiling steps used to produce executable instruction or code. If the input software fails to conform to the rules, the parser can issue one or more errors messages.

There are multiple varieties or classes of parsers (e.g., SLR, LR and LALR). LALR (Look-Ahead Left-to-right Rightmost derivation) parsers are particularly popular and can be generated using automated parser generator tools such as YACC and GNU Bison. In general, once created, a parser remains static.

Parsers are typically static or fixed at the time the parser is generated. Consequently, grammar and/or logic changes are not permitted when a document or software program is parsed, referred to herein as parse time. In practice, parsers for particular software languages are typically generated by software language designers and provided to software developers. The grammar is based upon syntax and structures of the programming language and incorporated into the parser. During operation, the parser ensures that input, such as a software program, adheres to the grammar. Consequently, the parser is fixed during build by the language designer and cannot be updated or modified by the software developers or users.

The static nature of parsers can limit parser utility. For instance, overtime software languages grow, change and adapt to meet the needs of software developers and software products. Frequently, software providers release multiple versions of languages or tools. Overall, incremental changes between the versions may be relatively small in comparison to similarities between versions. However, static nature of the grammars can make maintaining backward compatibility with previous versions complex. One possible solution is simply to provide multiple versions of the parser to support previous code versions. However, the parser can be quite large and it may become impractical to provide multiple versions. Alternatively, a single grammar can be designed to support multiple versions. However, this increases complexity of the grammar.

Another problem related to nature of static parsers is excessive reservation of keywords. For example, in the SQL language "select," "from" and "where" all have a special meaning within the language. LALR parsers require such words to be reserved strictly for their specific purpose as keywords. Consequently, such words cannot be used as variable names or identifiers within the software code to be parsed. As a language grows and increases in complexity and features, the list of reserved words typically grows. Software developers may become frustrated at increasing limitations on permissible vocabulary. Moreover, some of the features for which words are reserved are likely to be relatively obscure. Software developers may be prevented from using certain terms, even though the developer has no interest in the particular special meaning associated with the term.

Limitations on use of restricted words may be particularly frustrating since at least some of the keywords may have a special meaning only within a particular context. For example, in SQL the term "key" may have a special meaning only within the context of a "create table" statement, where "key" designates a particular column that serves as a key to the data table. Outside of the "create table" statement, "key" has no particular meaning and theoretically could be used as a variable name or identifier. However, a typical LALR parser would require that "key" be restricted throughout the software code, since such parsers require reservation of all such terms in a static manner.

Workarounds may be available to resolve some of the described issues. For example, lexical feedback can be utilized. However, lexical feedback may have a number of drawbacks. For example, the lookahead property can be problematic for lexical feedback. Lookahead generally refers to looking ahead to additional input tokens before making a decision at a stage of an algorithm. Parsing of lookaheads may not be reported explicitly. Consequently, designing a lexical feedback solution can be relatively complex. In addition, parsers that include lexical feedback can be difficult to maintain. Seemingly unrelated grammar changes may introduce lookahead and affect lexical feedback logic. In addition, the more lexical feedback is utilized within a parser, the less the initial grammar of the parser corresponds to the actual grammar used to parse documents. This can present problems in maintenance and documentation of the parser.

Turning now to the figures, many of the problems related to the fixed nature of parsers can be resolved by the introduction of conditional tokens. In general, a token is a categorized block of text that can be parsed. Conditional tokens allow dynamic transformation or translation of an input token into another token. In particular, a parent token can be transformed into one of a set of subtokens or child tokens associated with the parent token. Transformation or replacement of a parent token can depend upon context in which the parent token appears and/or global state information (e.g., parser version to be utilized). As used herein, context for a token refers to the environment in which the token occurs. For example, context can refer to the presence of a token within a particular statement or rule. The transformation of the parent token to a subtoken can take place at actual parse time. After transformation, the parser can process the subtokens as regular tokens.

Transformation can be controlled using independent transform functions. Transform functions can be provided by the parser creator or by software developers or other users of the parser. Parent tokens and subtokens can be declared or defined in the original grammar. However, control of transformation by the transform function provides for activation or deactivation of different grammar rules, effectively resulting in a dynamic parser.

FIG. 1 illustrates a system 100 that processes conditional tokens. The system 100 can be part of a dynamic parser (not shown). A conditional token identifier 102 can identify a token for transformation based upon grammar rules incorporated in the parser. The grammar can include a declaration that defines token hierarchy, where a parent token can be transformed or replaced by any of its child tokens, also referred to as subtokens. Each parent token can be associated with multiple subtokens, while a subtoken can be associated with a single parent token. In general, token hierarchy is limited such that a subtoken cannot serve as a parent for other subtokens. This limitation can prevent recursion problems.

Each token can have an associated attribute referred to as the context. Context information can include information regarding tokens that surround the particular token. A context can be shared across multiple subtokens and parent tokens. Subtokens can be used in the grammar alongside parent tokens and nonconditional tokens, subject to consistency restrictions described below.

A transformation manager component 104 can utilize the parent token, global state information, context information or any other relevant to manage transformation of the parent token into one or more of the subtokens. In particular, transformation manager component 104 can call a transform function (not shown) that translates the parent token into the appropriate subtoken. This transform function can be independent of the parser and can be written or adapted after the parser itself is built. The transform function allows dynamic parsing of input documents. Utilizing conditional tokens, parsing decisions can be made dynamically based upon token context, parser state or other parameters. At the same time grammar remains statically consistent and unambiguous.

Figure 2:
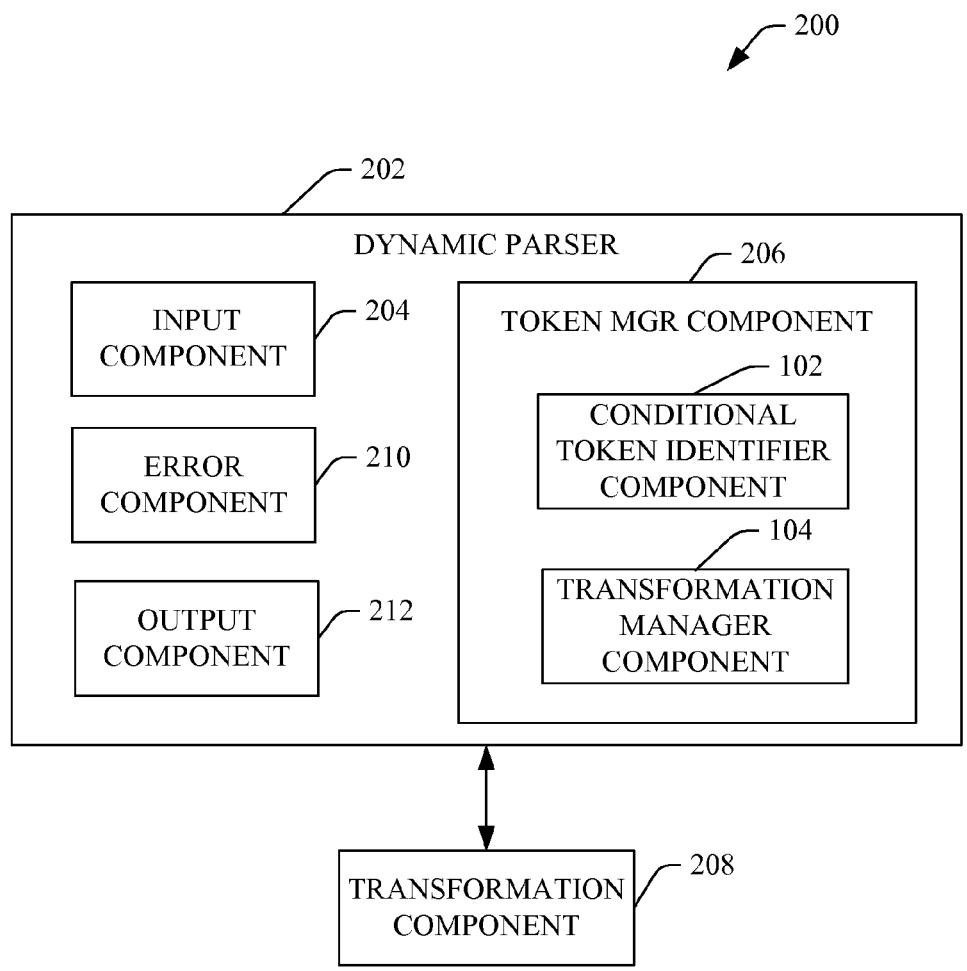
FIG. 2 is a block diagram of a system that provides for dynamic parsing in accordance with an aspect of the subject matter disclosed herein.

Referring now to FIG. 2, an aspect of a system 200 utilizing a dynamic parser 202 is illustrated. The dynamic parser 202 can include an input component 204 that can obtain input from a text document, software program, a text stream or other input. In aspects, the input component 204 can utilize lexical analysis to identify tokens. During lexical analysis, input characters are processed to produce a sequence of symbols referred to as 'lexical tokens' or tokens. A lexical analyzer, also referred to as a lexer, can be an independent component (not shown).

A token manager component 206 can analyze input tokens, including parent tokens and subtokens. The token manager component 206 can include conditional token identifier component 102 and a transformation manager component 104 as described with respect to FIG. 1. The transformation manager component 104 can utilize a transformation component 208 to translate a parent token into one or more subtokens based upon the associated context. The transformation component 208 can be an independent function that can be created and/or modified separately from the dynamic parser 202 and used at parse time. The transformation component 208 can be used in conjunction with conditional tokens to select grammar rules to apply to input.

The dynamic parser 202 can also include an error component 210 that can handle errors in the input. The error component 210 can provide users with error messages that identify such errors within the input document. Such error messages can be based upon syntax errors involving nonconditional tokens, parent tokens and/or subtokens. In addition, the transformation component 208 can provide error information to the dynamic parser 202, based upon analysis of a parent token and context. Such error information can be used by the error component 210 to generate appropriate error messages and halt parsing as needed. Error messages can be provided to parser users through any type of user interface (not shown) including a simple text message, a graphic user interface or any other suitable interface.

Output component 212 can provide output based upon parsing of the input. In particular, if a software program is parsed, the output component 212 can generate a data structure that reflects the programming language grammar (e.g., parse tree). The data structure can be used for additional compilation processing to produce executable code based upon an input software program.

The addition of the conditional tokens can be used to mitigate issues of excessive reservation of keywords. In particular, conditional tokens can be used to define a keyword limited to a particular context. Since it is not necessary to reserve the keyword globally, the word can be used in other contexts without the special meaning.

To create a context specific keyword using conditional tokens, a set of subtokens related to the keyword can be defined for a particular context. In particular, a parent token "identifier" can be defined with a set of subtokens, such that the parent token can be transformed into one or more of the subtokens based upon the context. Since transformation is dependent upon context, the parent token is transformed only within the specified context. In other contexts, the parent token will still be treated as "identifier". This will allow it to be used as name of a table, variable, or other programming object. The following example illustrates use of conditional tokens to produce context specific reserved words.

In a database language (e.g., SQL), create table and create procedure functions can be used to generate data tables and functions, respectively. Typically, after a keyword like "create", terms such as "procedure" and/or "table" would also be reserved and could not be used in other contexts. However, use of conditional tokens allows the words "procedure" and "table" to be reserved only when located after keyword "create." It is important to note that not all keywords have limited contexts. The keyword "create" remains reserved throughout the grammar in the example.

First, the grammar used to generate the parser can include one or more conditional token declarations. The following exemplary subtoken definition syntax can be used to define subtokens:

```
%subtoken context_id(parent_token) subtoken [subtoken ...]
```

Here, context_id represents the particular context, parent_token represents the parent token, and any subtokens of the parent token can be included in the brackets. The following exemplary statement would define a parent token IDENTIFIER with two subtokens, ID_TABLE and ID_PROCEDURE.

```
%subtoken AFTER_CREATE(IDENTIFIER) ID_TABLE
    ID_PROCEDURE
```

Note that the name of the context_id (e.g., AFTER_CREATE) may not provide actual information to the parser. It may simply be a mnemonic that allows the transmission of context information to the transformation component. Subtokens defined with a % subtoken statement can inherit type from the parent token.

The following exemplary grammar defines the create table statement and create procedure statement using the conditional tokens:

```
create_table_statement: CREATE ID_TABLE create_table_body;
create_procedure_statement:CREATE ID_PROCEDURE
    create_procedure_body;
statement: create_table_statement | create_procedure_statement;
```

Here, the context that triggers parent token transformation to either ID_TABLE or ID_PROCEDURE subtokens is location of IDENTIFIER after the CREATE keyword.

The transformation component 208 can utilize the following exemplary transform function to handle transformation of the IDENTIFIER parent token to either ID_TABLE or ID_PROCEDURE subtokens:

```
int yytransform(CParser *p, int yychar, YYSTYPE *yylval, short context)
{
switch (context)
    {
    case AFTER_CREATE:
        assert(yychar == IDENTIFIER);
        if (strcmp(yylval->id.name, "TABLE") == 0)
            return ID_TABLE;
        else if (strcmp(yylval->id.name, "PROCEDURE") == 0)
            return ID_PROCEDURE;
        else
            return ID_GENERAL_CREATE;
return yychar;
}
```

Here, Cparser *p is a global parser environment object and can be used to pass environment information to the transform function, while keeping the code thread-safe. Parameter yychar is the token code for the token to be transformed. The *yylval parameter of type YYSTYPE contains extended token information. The parameter 'context' contains the parser context code from the % subtoken declaration above.

The exemplary transform function includes a switch statement based upon the context (e.g., AFTER_CREATE). The transform function can compare the identifier to the string "TABLE". If the two are equal, the ID_TABLE subtoken is returned. Otherwise, the identifier can be compared to the string "PROCEDURE". If the identifier is equal to PROCEDURE, the ID_PROCEDURE subtoken is returned. If none of the specific cases are matched, a general CREATE token is returned. While the example above utilizes only two context specific keywords, TABLE and PROCEDURE, any number of keywords can be used.

Conditional tokens can also be used to mitigate issues related to backward compatibility discussed above. Conditional tokens can be used to selectively activate and deactivate grammar rules for the dynamic parser 202. For example, in a first version of a software language a first grammar rule may apply, while in a second version, a new, second grammar rule can replace the first grammar rule. Instead of requiring creation of two separate, static parsers, a single dynamic parser can include both grammar rules. At parse time the correct rule can be selected based upon context, such as version number.

In the following example, the parser is backward compatible with a previous version of the grammar. Here, the function argument syntax varies slightly between the two versions. In particular, the style of arguments after a left parenthesis "(" differs. Accordingly, subtokens can be declared for the two versions as follows:

```
%subtoken
FUNCTION_CALL('(') LEFT_PAREN_1 LEFT_PAREN_2
Parent token '(' is associated with two subtokens LEFT_PAREN_1 and
LEFT_PAREN_2.
    function_call:
        IDENTIFIER LEFT_PAREN_1 arguments_style1 ')'
        | IDENTIFIER LEFT_PAREN_2 arguments_style2 ')';
```

Actual syntax differences based upon differences in definitions of arguments_style1 and arguments_style2 and are not important for purposes of this example.

The following exemplary transform function can be utilized to select the appropriate argument style:

```
int yytransform(CParser *p, int yychar, YYSTYPE *yylval, short context)
{
    switch (context)
        {
        case FUNCTION_CALL:
            assert(yychar == '(');
            if (p->GetCompatibilityLevel( ) == 1)
                return LEFT_PAREN_1;
            else
                return LEFT_PAREN_2;
        default:
            assert(0);
        }
    return yychar;
}
```

The transform function accesses global environment information provided in parameter 'p' to determine the version or compatibility level and choose between subtokens LEFT_PAREN1 and LEFT_PAREN2. This choice allows the parser to utilize the corresponding rule dynamically. It is also important to note that the parent token '(' is not affected in other contexts in the grammar, where the parent token simply does not get transformed.

Figure 3:
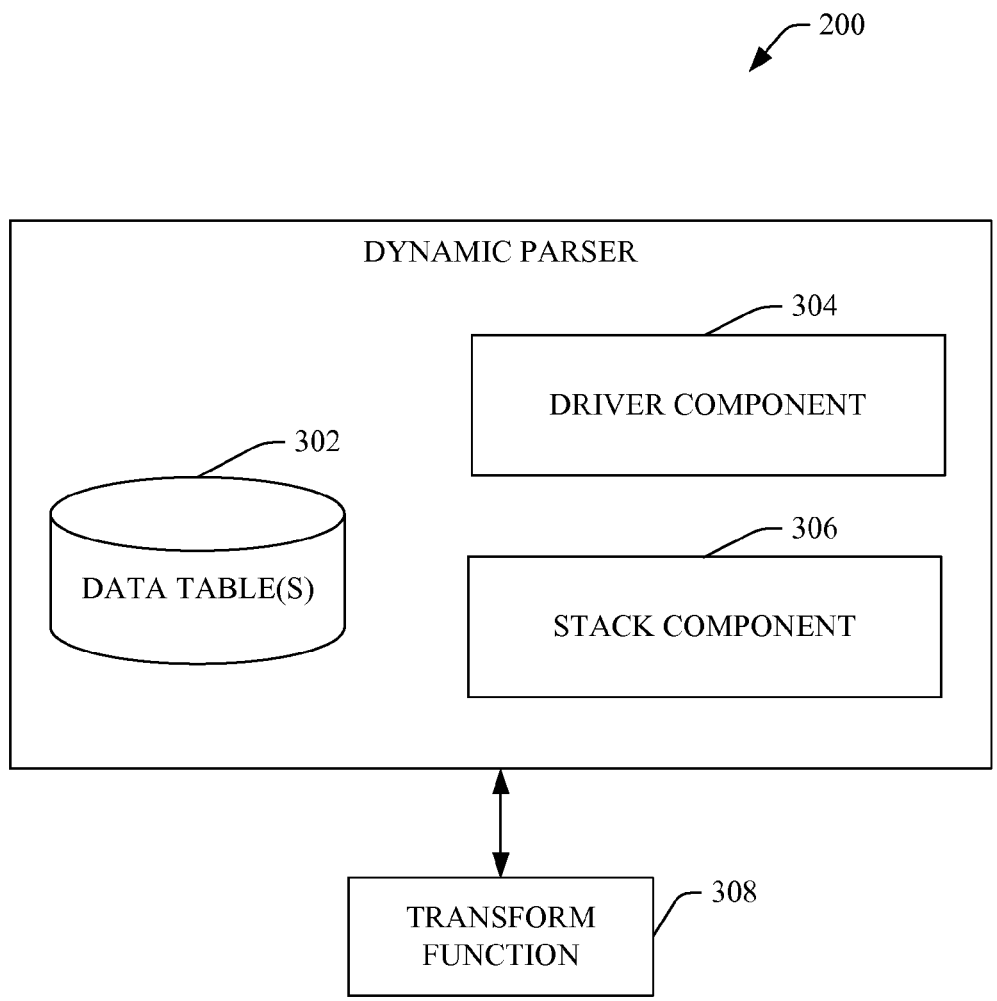
FIG. 3 is a block diagram of another system that provides for dynamic parsing in accordance with an aspect of the subject matter disclosed herein.

Referring now to FIG. 3, a further aspect of the dynamic parser system illustrated in FIG. 2 is depicted. In general, an LALR parser can include a set of data tables 302 and an associated driver component 304 that utilizes the tables 302 to perform parsing of input. The data tables 302 can include large arrays of integers that denote token codes within the parser grammar, actions to be taken when a particular token code is encountered, grammar rules that are to be applied when certain token codes are encountered and any other pertinent information. The data tables 302 can act as a state machine, where entries in the table represent particular states and the driver component 304 moves through the states as tokens are processed. As used herein, state indicates current conditions or environment based upon processed tokens and any other relevant information (e.g., parser version).

The driver component 304 can contain the logic to move through the data tables 302 based upon the tokens and identifiers obtained from the input. For instance, the driver component 304 can obtain a token from input and consult the data table 302 to determine an appropriate action to take for that token. Based upon the information in the token data, the driver component 304 can update the state, grammar rule and token.

The driver component 304 can handle small software code fragments embedded in the grammar. These fragments provide for the generation of a parse tree. For example, upon recognition of a create table statement, the driver component 304 can execute an associated piece of code to create the appropriate tree structure.

Tokens are associated with a limited set of actions, including "shift," "reduce," and now "transform." The driver component 304 can add a token to a stack component 306, referred to as the "shift" action. The driver component 304 can perform shifts when a token has been accepted as valid, but has not yet been recognized as satisfying a particular grammar rule. In the meantime, the token is shifted onto the stack component 306. The driver component 304 can remove tokens from the stack component 306 using a "reduce" action. Once the tokens in the stack are identified as satisfying a particular grammar rule, the tokens can be removed from the stack and any corresponding code can be executed. For each position in the data tables 302, there should be a single action to prevent ambiguity.

The driver component 304 in a dynamic parser can also perform a "transform" action in addition to shift and reduce actions. The transform action can invoke a transform function 308 corresponding to the transformation component. The transform function 308 can accept context and token information and can be independent of the driver component 304 and data tables 302. The transform function 308 can return a transformed token or a special token "error."

The following exemplary pseudocode illustrates a dynamic parsing algorithm:

```
set ip to point to the first symbol of w$;
repeat forever begin
    let s be the state on top of the stack and a the symbol pointed to by ip;
    if action[s, a] = transform c then begin
        let b = transform(c, a);
        if b = error then
            error( )
    end
    else
        let b = a;
```

```
    if action[s, b] = shift s' then begin
        push b then s' on top of the stack;
        advance ip to the next input symbol
    end
    else if action[s, b] = reduce A -> beta then begin
        pop 2 * |beta| symbols off the stack;
        let s' be the state now on top of the stack;
        push A then goto[s', A] on top of the stack;
        output the production A -> beta
    end
    else if action[s, b] = accept then
        return
    else error( )
end
```

The algorithm consists of a loop that processes each token or symbol as received. The algorithm first determines if the appropriate action for a token, a, based upon state s is transformation. An action array maintained in the data tables 302 can be consulted to determine the appropriate action. If the token is to be transformed or translated, the transform function, transform, is called with parameters including context c and token a. The transform function will either return a transformed token or an error message. The output of the transform function is stored in token b. If the token was not transformed, the original token is stored in token b.

After transformation processing, token b will contain either the transformed token or the original token, depending upon whether the transform action was triggered. The algorithm next determines if the appropriate action for token b based upon state s is a shift action. If yes, the driver component 304 pushes the token b onto the stack component 306 and advances to the next token. Otherwise, the driver component 304 determines if the appropriate action for token b based upon state s is reduce A->beta. If yes, the stack 306 is manipulated to pop the appropriate tokens off the stack and trigger the appropriate rule and any associated code. If no, the driver component 304 determines if the appropriate action is equal to an "accept" action, in which case the process terminates. Finally, if the action is equal to any of the above, an error is generated.

It is important to note that transform function is triggered before a token is shifted, regardless of whether the token was read from an input stream or was provided from a lookahead buffer. This allows the transform function to remain independent of lookahead.

Figure 4:
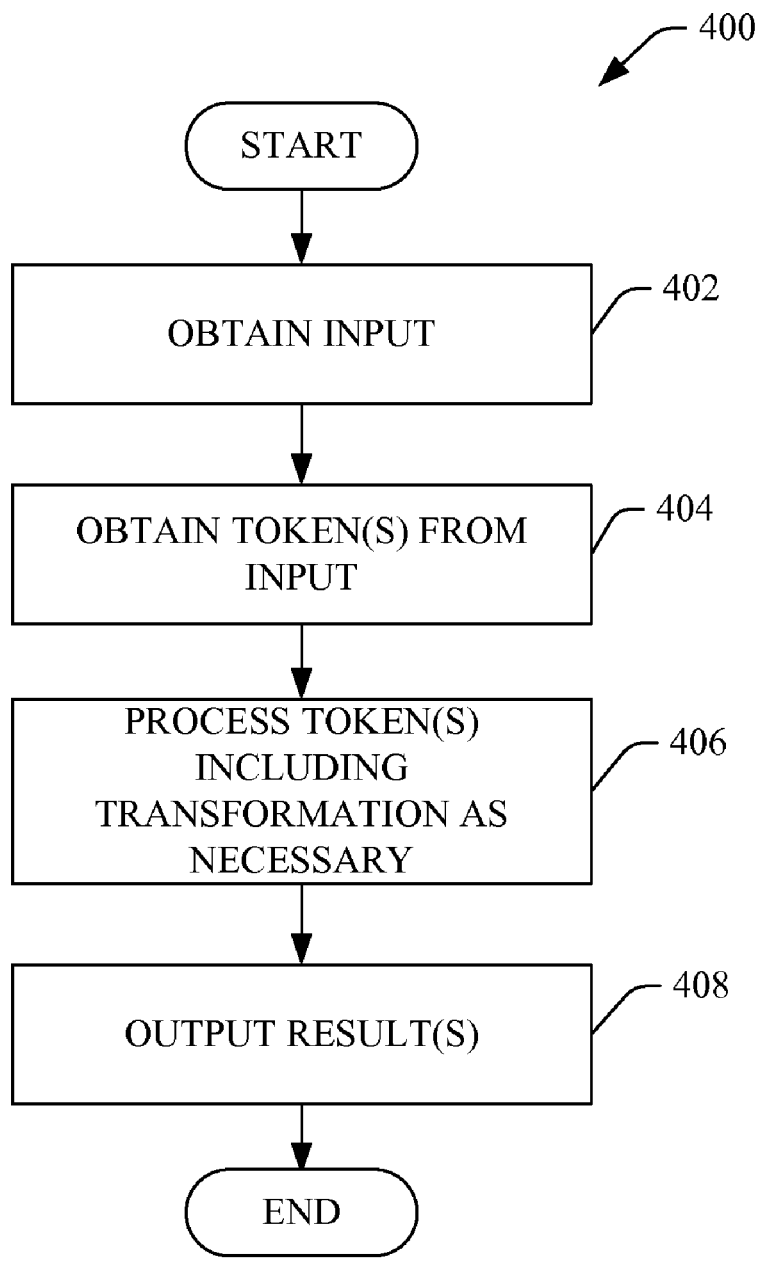
FIG. 4 illustrates an exemplary methodology for performing dynamic parsing utilizing conditional tokens in accordance with an aspect of the subject matter disclosed herein.

Turning now to FIG. 4, an exemplary methodology 400 for parsing input utilizing conditional tokens is illustrated. At 402, input is obtained. Input can include a text document or text stream including software code or other data. The input can be received at a parser, read from a data file or obtained in any other manner. One or more tokens can be obtained from the input at 404. In aspects, a lexical analyzer or lexer can be used to read received text, remove whitespace, and identify tokens for processing by the parser.

At 406, obtained tokens are processed. In aspects, each token can be processed as it is obtained from the input. Alternatively, a set of tokens can be can be obtained from input and processed as a group. The obtained tokens can include conditional tokens, which can also be processed. In particular, parent tokens can be transformed or translated to one of the subtokens associated with the parent token. Translation can be dependent upon current parser state or token context. During processing, tokens can be evaluated with respect to the grammar or rules of the parser. If the tokens fail to comply with parser grammar, an error message can be generated.

At 408, results of token processing can be output. Results can include error messages describing grammar errors. In addition, output can include data structures useful for further processing of the data evaluated by the parser. For example, for software program compilation, the parser can generate a parse tree used for further compiling and generation of the software executable.

Figure 5:
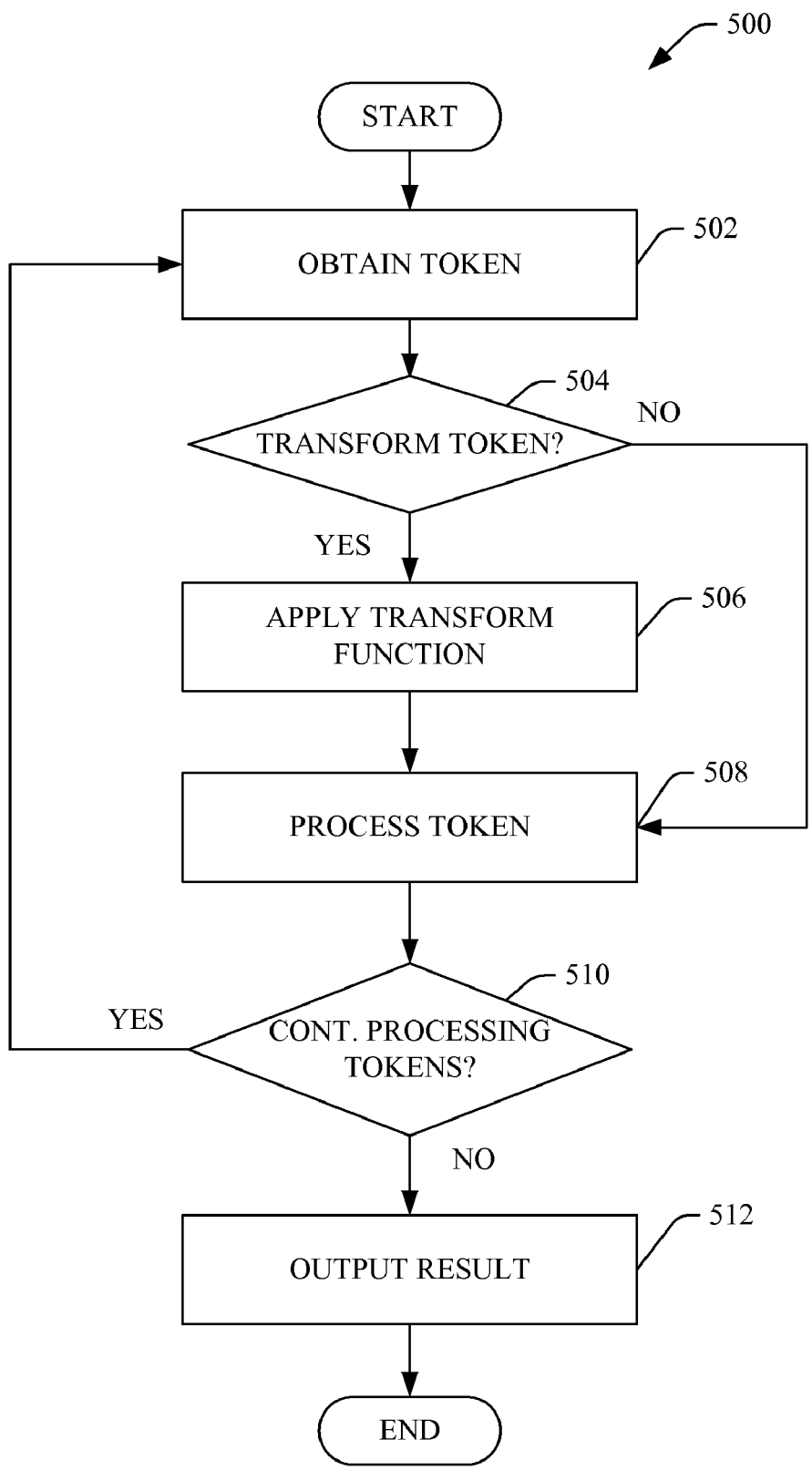
FIG. 5 illustrates another exemplary methodology for performing dynamic parsing utilizing conditional tokens in accordance with an aspect of the subject matter disclosed herein.

Referring to FIG. 5, a more detailed exemplary method 500 for parsing utilizing conditional tokens is illustrated. At 502, a token is obtained for processing. At 504, a determination is made as to whether the token is to be transformed. In particular, the data tables can be consulted. The decision regarding transformation can be a function of the table data, the token and/or the current parser state. If yes, the transform function can be applied or invoked at 506 and the appropriate subtoken or subtokens can be obtained. The transform function can utilize context to determine the appropriate subtoken and proceed to 508. If no, the transform function is not invoked and the process continues at 508.

Either the original token or transformed token can be processed at 508. Processing of the token can include performing shift or reduce actions, manipulation of a stack and execution of associated pieces of code. In addition, both processing of the token at 508 and transformation of the token at 506 can result in errors if the input does not conform to the grammar of the dynamic parser.

At 510, a determination is made as to whether to continue processing input. If yes, the process can continue at 502 where the next token can be obtained. However, if processing of input is to terminate, for example, if all tokens have been processed or if an error has been generated, the process can continue at 512. Results can be provided at 512. Output can include error messages indicating any problems with the input or any other feedback. Such messages can be provided in a simple line of text, using a graphic user interface or via any other mechanism. Output can also include data structures generated based upon the input. For example, parsers used in software compilation can generate parse trees based upon the structure of the software language. Such parse trees can be used for further compilation and generation of executable software.

Figure 6:
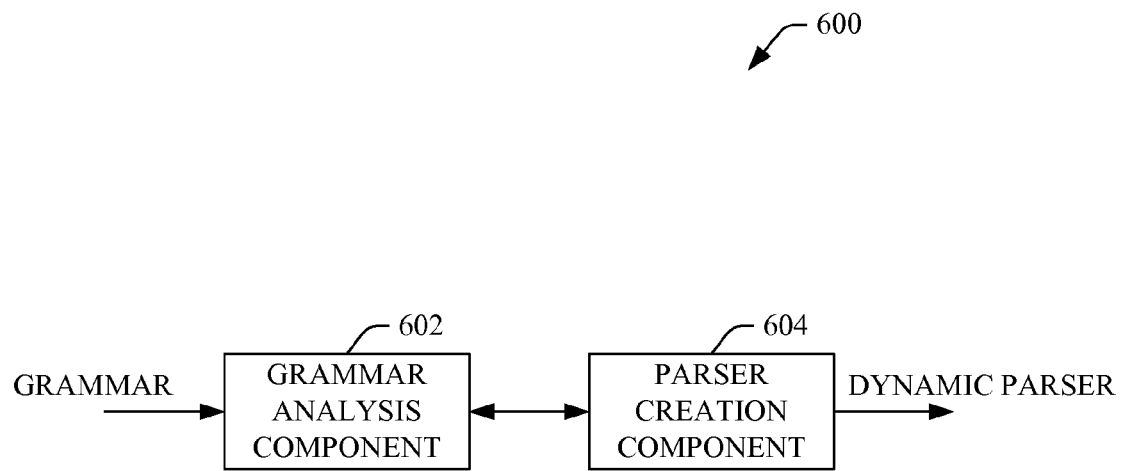
FIG. 6 illustrates an exemplary system that enables generation of a dynamic parser in accordance with an aspect of the subject matter disclosed herein.

Turning now to FIG. 6, parsers can be created using automated parser generators (e.g., YACC and GNU Bison). Such parser generators can create parsers, typically LALR parsers, based upon a grammar defined in a formal description. The parser generator can evaluate the formal grammar to ensure that it conforms to grammar requirements and utilize the grammar as a seed from which to create a parser. Conventionally, static parsers are constructed by language designers and shipped to software developers.

Referring now to FIG. 6, an exemplary system 600 that enables generation of a dynamic parser is illustrated. The system 600 can include a grammar analysis component 602 that analyzes an obtained grammar. The grammar analysis component 602 can also analyze any conditional tokens as defined by a grammar. For example, grammar analysis component 602 can process parent token and subtokens declarations.

Based upon the analysis of the provided grammar, a parser creation component 604 can generate a dynamic parser derived from the grammar. The dynamic parser can be implemented as described with respect to FIGS. 1 through 5. Once generated, the dynamic parser can be shipped to software developers. Such developers can generate or adapt transform functions for use with the dynamic parser to allow the parser to activate, deactivate and/or select rules at parse time.

Figure 7:
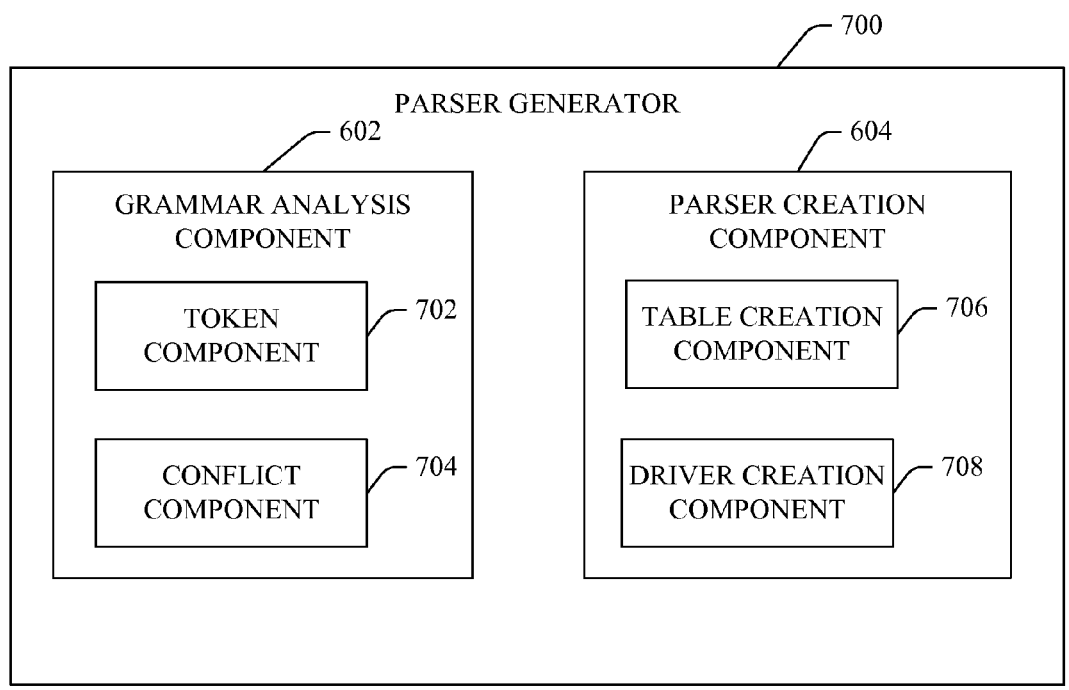
FIG. 7 illustrates another exemplary system that enables generation of a dynamic parser in accordance with an aspect of the subject matter disclosed herein.

Turning now to FIG. 7, an exemplary parser generator 700 is illustrated. The parser generator 700 can include a grammar analysis component 602 and a parser creation component 604, similar to those illustrated with respect to FIG. 6. Grammar analysis component 602 can include a token component 702 that analyzes token declarations, including subtoken declarations. Grammar analysis component 602 can also include a conflict component 704 that evaluates consistency of the grammar and identifies any errors or logic problems within the grammar.

Traditionally, LALR parsers have identified two different conflicts: "shift/reduce" conflicts and "reduce/reduce" conflicts. In a shift/reduce conflict, there is conflict between a shift action and a reduce action for the grammar. Only a single action can be entered into the data table for a grammar rule. If a rule has both a shift and reduce action for a token table entry, a conflict is generated. Conversely, in a reduce/reduce conflict, it is clear from the grammar that a reduce action can be performed, but more than one rule matches the pattern of tokens within the stack. Consequently, it is unclear which rule should be used during the reduce action. The conflict component 704 can evaluate the grammar for such inconsistencies or ambiguities. If an inconsistency is identified, the parser generator 700 can produce an error message directing the grammar developer to correct the rule in question.

The introduction of the parent token and subtoken hierarchy allows for additional consistency errors. The conflict component 704 can also identify these new potential errors prior to generation of the dynamic parser. Due to hierarchical token structure, a new "shift/shift" conflict can be generated. A shift/shift conflict occurs when the grammar allows both shift of a subtoken and a shift of its parent token. This can lead to ambiguity regarding whether the parent token is to be transformed or whether the parent token is to be shifted as is.

The shift/shift conflict can be illustrated in the following example. Referring again to the examples described above, a general CREATE statement can be added to the previous grammar, resulting in the following exemplary grammar:

```
%subtoken AFTER_CREATE(IDENTIFIER)
ID_TABLE ID_PROCEDURE
general_create_statement: CREATE IDENTIFIER general_create_body;
create_table_statement: CREATE ID_TABLE create_table_body;
create_procedure_statement:CREATE ID_PROCEDURE
    create_procedure_body;
```

In addition, the definition of "statement" can be updated as follows:
  statement:
    create_table_statement|create_procedure_
       statement|general_create_statement;

The conflict component 704 can recognize the shift/shift conflict created by the preceding grammar. It is unclear whether parent token IDENTIFIER should be shifted or transformed into one of subtoken ID_TABLE or ID_PROCEDURE. Accordingly, the parser generator 700 can produce an error statement such as the following exemplary error message:

```
<S1>: shift/shift conflict (shift <S2> on parent token IDENTIFIER,
   shift <S3> on subtoken ID_TABLE)
<S4>: shift/shift conflict (shift <S5> on parent token IDENTIFIER,
   shift <S6> on subtoken ID_PROCEDURE)
```

It is important to note that the error is an actual logical conflict in the grammar, rather than a simple syntax problem. The grammar above does not specify how conditional keywords TABLE and PROCEDURE are to be processed, either individually or as part of a general create statement.

The error described above can be resolved by treating TABLE and PROCEDURE as individual conditional keywords, and grouping all other identifiers into the 'general' category. The following exemplary grammar reflects this strategy:

```
%subtoken AFTER_CREATE(IDENTIFIER) ID_TABLE
    ID_PROCEDURE ID_GENERAL_CREATE
```

In addition, the general create statement definition can be modified as follows:

```
general_create_statement: CREATE ID_GENERAL_CREATE
    general_create_body;
```

This strategy eliminates shift/shift conflicts.

The conflict component 704 can also identify a second type of shift/shift conflict. In each parser state, shift actions of two subtokens of the same parent token are allowed only if the subtokens have the same context attribute. If the context attributes for subtokens differ, another shift/shift conflict occurs. So, if a parent token is to be split into subtokens in one context, such as after a create keyword, the same subtokens should not be used after another keyword, such as the drop keyword. The following exemplary grammar adds a drop statement and illustrates this second type of shift/shift conflict:

```
%subtoken AFTER_DROP(IDENTIFIER) ID_TRIGGER ID_INDEX
drop_trigger_statement: DROP ID_TRIGGER drop_trigger_body;
drop_index_statement: DROP ID_INDEX drop_index_body;
drop_table_statement: DROP ID_TABLE drop_table_body;
```

Addition of the final definition can trigger the following exemplary error message:

```
<S1>: shift/shift conflict (shift <S2> on subtoken
    ID_TRIGGER(AFTER_DROP), shift <S3> on subtoken
    ID_TABLE(AFTER_CREATE))
<S4>: shift/shift conflict (shift <S5> on subtoken
    ID_INDEX(AFTER_DROP),
    shift <S6> on subtoken ID_TABLE(AFTER_CREATE))
```

The conflict component 704 ensures that context identifiers used in subtoken declarations correspond to unique parser states. This is necessary for the transform function to be unambiguous. One possible solution for the inconsistency in the preceding code would be to change the subtoken declaration to declare the DROP particular version of the TABLE keyword as follows:

```
%subtoken AFTER_DROP(IDENTIFIER) ID_TRIGGER ID_INDEX
    ID_DROP_TABLE
```

The following is an exemplary transform function for both Create and Drop statements in the grammar described above:

```
int yytransform(CParser *p, int yychar, YYSTYPE *yylval, short context)
{
    switch (context)
    {
        case AFTER_CREATE:
            assert(yychar == IDENTIFIER);
            if (strcmp(yylval->id.name, "TABLE") == 0)
                return ID_TABLE;
            else if (strcmp(yylval->id.name, "PROCEDURE") == 0)
                return ID_PROCEDURE;
            else
                return ID_GENERAL_CREATE;
        case AFTER_DROP:
            assert(yychar == IDENTIFIER);
            if (strcmp(yylval->id.name, "TRIGGER") == 0)
                return ID_TRIGGER;
            else if (strcmp(yylval->id.name, "INDEX") == 0)
                return ID_INDEX;
            else if (strcmp(yylval->id.name, "TABLE") == 0)
                return ID_DROP_TABLE;
            else
            {
                print_error("Invalid DROP type %s",
                    yylval->id.name);
                break;
            }
        default:
            assert(0);
    }
    return yychar;
}
```

The transform function, yytransform, has four parameters, *p, yychar, *yylval and context. The first parameter, CParser *p is a global parser environment object. The type "CParser" can used to pass the global environment to the transform function while keeping the code thread-safe. This *p parameter is a convenient place to pass dynamic flags to the transform function.

The second parameter, yychar, can be a token code representative of the token to be transformed. The third parameter, *yylvl, contains the extended token information. In this example, it is assumed assume that the % union type corresponding to the IDENTIFIER token type is "id" and it has a field "name" that holds a string representation of the identifier. The final parameter, context, represents the parser context code from the % subtoken declaration.

The transform function, yytransform, returns the transformed token code. The transform function may also change the value of "yylval", although this was not necessary in the example above. Normally, the returned token code will be different from the initial token passed in yychar parameter. However, as the sample implementation shows, there will be cases when the function cannot successfully transform the token. For example, the grammar above only accepts three possible keywords after a DROP statement. If the identifier does not match one of the three defined identifiers, an error would be generated. In general, the transform function is in the best position to issue the most appropriate error message. The transform function can inform the dynamic parser that an error occurred and the parser can switch to error recovery mode. Error reporting can be accomplished by returning the initial token code intact. The parser can recognize that the token has not been transformed and can treat this as a transform failure.

Parsers can assume a certain level of consistency from transform functions. When called in a particular parser context indicated by the "context" parameter, the transform function should only return a subtoken declared in the corresponding % subtoken definition. Returning a different token code may lead to unpredictable parser behavior.

Referring once again to FIG. 7, the parser generator 700 can also include a table creation component 706 that generates the data tables. Data tables are created consistent with the provided grammar. The table can include actions such as shift reduce as well as the transform action used to transform tokens for dynamic parsing. The table creation component 706 can coordinate with the conflict component 704 to prevent generation of conflicts. The following exemplary pseudocode can be utilized to check for conflicts during table generation:

---

If there is a "shift" action at position action[i, a], where a is a subtoken of b with the context attribute c, we look at the action[i, b].
If action[i, b] = "shift", or action[i, b] = "transform c' ", where c' != c, a shift/shift conflict occurs and the algorithm fails.
Otherwise, action[i, b] is set to "transform c".

---

Here, after actions in the parser state i are set, all 'shift' actions in the state are examined again for conflicts.

In addition to the conflict check of the table, the table creation component 706 can review lookahead items for the token hierarchy utilized for conditional tokens. In particular, after table generation, the table creation component 706 can review lookahead items in all sets. Lookahead items that are subtokens can be replaced by their parent tokens.

The parser generator 700 can also include a driver creation component 708 that generates a driver for the dynamic parser. The generated driver can be utilized in conjunction with the generated data tables to perform dynamic parsing. In addition, generated drivers can utilize independent transform functions necessary for dynamic parsing.

Figure 8:
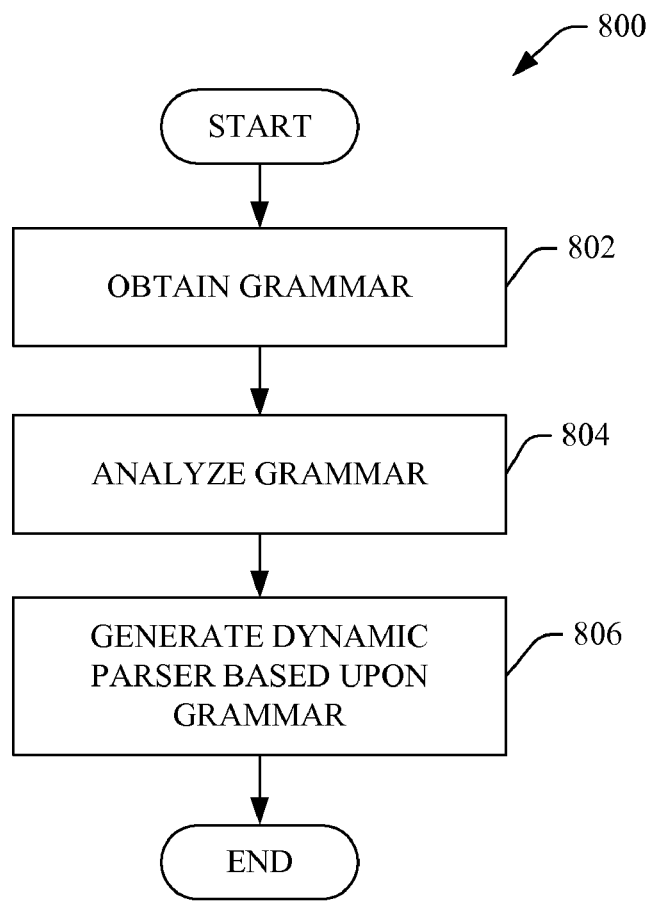
FIG. 8 illustrates a methodology for generating a dynamic parser capable of utilizing conditional tokens in accordance with an aspect of the subject matter disclosed herein.

Referring now to FIG. 8, a methodology 800 for generating a dynamic parser capable of utilizing conditional tokens is illustrated. At 802, a grammar can be obtained. The grammar can provide for conditional tokens. Specifically, the grammar rules can include a parent token and subtokens declarations. The grammar can be provided using a formal description that can be utilized as a seed from which to create a dynamic parser.

At 804, the grammar can be analyzed to ensure logic consistency and to prepare for generation of a dynamic parser. At 806, a dynamic parser can be generated based upon the analysis of the grammar. While generated dynamic parsers include a fixed grammar, the parsers can utilize independent transform functions to selectively activate and deactivate various grammar rules.

Figure 9:
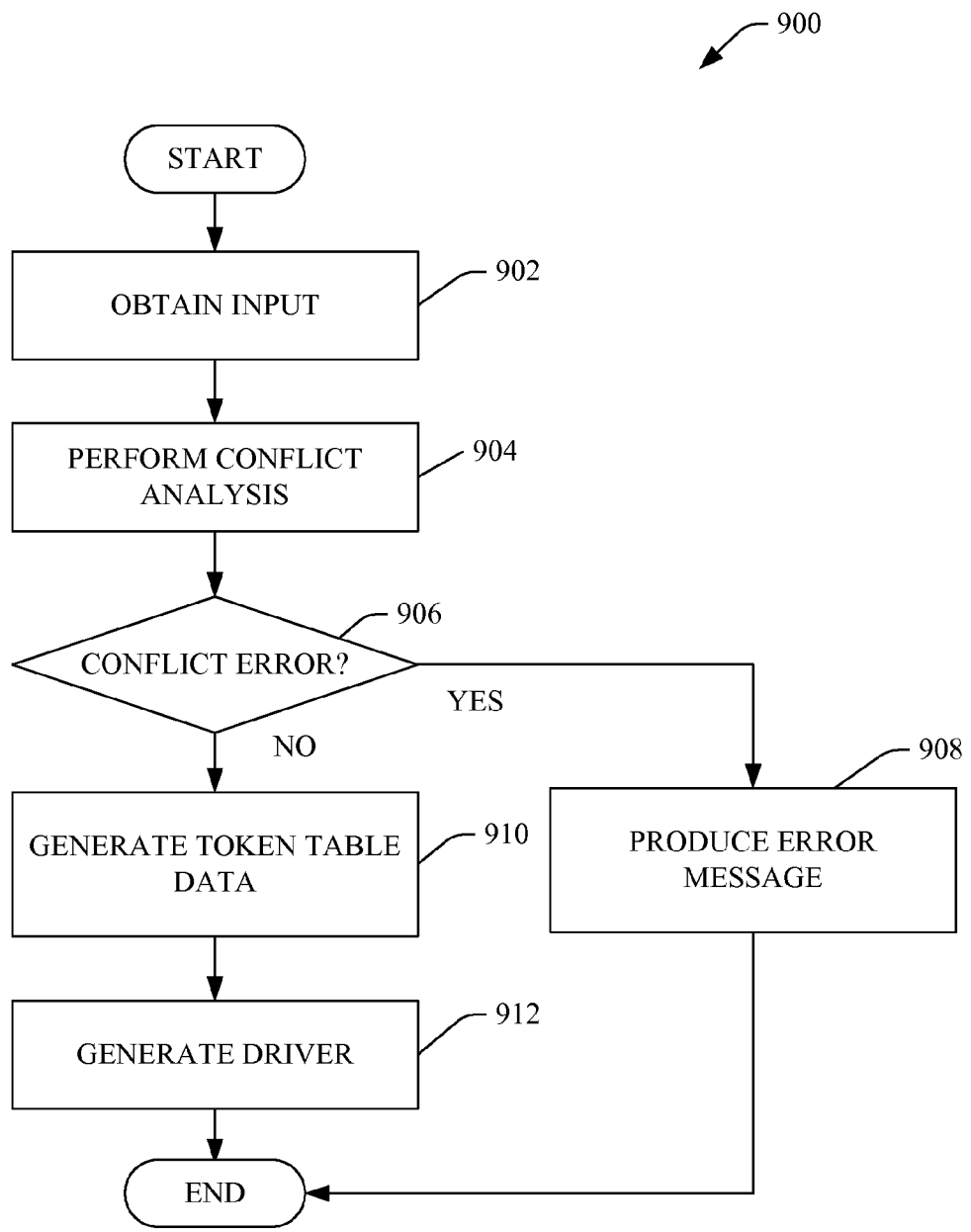
FIG. 9 illustrates another methodology for generating a dynamic parser capable of utilizing conditional tokens in accordance with an aspect of the subject matter disclosed herein.

Turning now to FIG. 9, another exemplary methodology 900 for generating a dynamic parser is illustrated. A grammar including conditional token information can be obtained at 902 and used as a seed for a dynamic parser. At 904, conflict analysis of the obtained grammar can be performed. In particular, shift/reduce conflicts, reduce/reduce conflicts and shift/shift conflicts can be identified during analysis of the grammar. At 906, a determination is made as to whether a conflict error has been detected. If yes, an error message can be generated at 908 and the parser generation process terminates. If no, parser generation continues at 910.

At 910, at least one data table can be generated based upon the grammar. The data table can incorporate grammar information. For example, the data table can indicate the appropriate action associated with a token based upon context, state and a particular grammar rule. Furthermore, additional error analysis can be performed during table generation. At 912, a parser driver can be created. The driver can utilize the information within the data tables to parse input. In addition, the driver can utilize an independent transform function at parse time. The transform function can translate or replace tokens based upon token context, providing for dynamic parsing of a set of tokens.

In aspects, a dynamic parser generator can be created by adapting available conventional parser generators, such as YACC. The following describes an exemplary method for adapting the Berkeley YACC software implementation to provide for dynamic parsing. First, a new data structure to track all "context" codes in % subtoken declarations can be provided as follows:

---

```
// token attribute structure
typedef struct attrib attrib;
struct attrib
{
    struct attrib *link;
    struct attrib *next;
    char *name;
    int value;
};
```

---

The term "attrib" or attribute refers to context. Ordinal numbers ("values") can be assigned by the parser generator in order of declaration.

In addition, the "bucket" structure can be adapted to represent subtokens using two new fields:

---

```
struct bucket *parent;
struct attrib *attr;
```

---

Here, "parent" is NULL for regular tokens and points to the parent token for subtokens. The "attr" field can point to the parser context for subtokens.

The grammar parser can be modified to accept the % subtoken syntax and create the corresponding data structures, such as attrib for contexts and bucket for each subtoken. The key function that contains this logic is named declare_subtokens, and it can be implemented similar to the declare_tokens function with a few straightforward modifications. Functions can also be added to the symtab.c file (e.g., create_attr_table, lookup_attr) to manage the list of "attrib" structures.

In file reader.c for pack_symbols, the list of buckets can be converted into several arrays (one per field) indexed by the tokens' numerical values. Two new arrays, symbol_parent and symbol_attr, can be created. The arrays correspond to the new "parent" and "attr" fields of the bucket structure. For each subtoken, symbol_parent provides an index (numerical value) of the parent token. For regular tokens, the value can be equal to zero. The symbol_attr array can contain the entire attrib structure for the subtoken.

The mkpar.c file can be adapted to include shift/shift conflict detection logic to remove conflicts. When this remove conflict logic is called, parser states are represented in an array, "parser," indexed by the state. Each state has an associated list of actions, each action marked by the "symbol" (next terminal from the input stream or nonterminal from the stack) and the "action" to take (SHIFT or REDUCE). There may still be conflicts at this point (e.g., there may be more than one action for a given symbol), but importantly, the list of actions can be sorted by the symbol, so all of the conflicting actions are grouped together. This makes the existing conflict-detecting code simple.

In contrast to the standard YACC conflicts (e.g., reduce/reduce conflict and shift/reduce conflicts), the shift/shift conflicts have actions marked by different token symbols. Consequently, shift/shift conflicts are not grouped together. However, there are two sorts of shift/shift conflicts that should be detected. In the first, in the same parser state, a subtoken and its parent token both have a SHIFT action. In the second type of shift/shift conflict, in the same parser state, two subtokens that share the same parent but different context both have a SHIFT action.

To identify these shift/shift conflicts, each time a SHIFT action is discovered, all SHIFT actions so far for this parser state can be rescanned to determine if one of the conflicts has occurred. This means the conflict-detection algorithm is quadratic based on the number of actions in each state. If this becomes problematic, the conflict detection algorithm can be adapted possibly by pre-sorting by the parent token value or creating a bitmap for each state indexed by the parent token value.

While checking for conflicts, actions that have a "suppressed" field set to two can be ignored. Such actions are effectively deleted from the parser as a result of a precedence-based conflict resolution. States that were determined as "truly conflicting" can be marked with "suppressed" field set to one.

The lalr.c file can also be adapted to provide for dynamic parsing. Fortunately, very few modifications are required for more complex portions of the LALR table derivation algorithm to implement conditional token functionality. For the purposes of LALR tables, subtokens are considered the same as regular tokens. The fact that they are generated by the transformation of their parent token is almost irrelevant. However, there are two important exceptions.

First, in a state where one or more subtokens of a certain parent token P cause a SHIFT, a new "TRANSFORM" action can be added for the parent token, supplying the corresponding context code as a parameter. Note that the conflict-detection algorithm guarantees that there is no existing SHIFT action for P in this state, and that there is a single context code to pass to TRANSFORM.

It is important to remember that the subtokens begin as their parent tokens and are transformed just prior to shifting. The fact that algorithm is ready to shift subtoken(s) really means that the parent token has been seen, and the transform function yytransform should be called before shifting the resulting subtoken. All this will be handled in the file output.c as described below.

In addition, when computing lookahead tokens for all parser states, the regular LALR algorithm can consider subtokens as regular lookahead tokens. To implement dynamic parsing with lookahead, the implementation can account for the fact that while subtoken is in the lookahead buffer, it is still represented as its parent token. Therefore, in the lookahead computation, all subtokens should really be considered their parent tokens, and should themselves not appear as lookahead tokens.

This modification of lookahead tokens can be implemented in the remap_subtokens function as a separate pass over lookahead tokens after the regular algorithm is finished. By this time, the lookahead tokens for each state are represented as an array of bitmaps (or, in other words, a "packed two-dimensional array of Booleans") called LA. Each bitmap can correspond to a parser state, and the bits corresponding to the possible lookahead tokens in that state. The remap_subtokens function can scan this array and replaces all bits that correspond to subtokens by the bits that correspond to their parent tokens.

The file output.c can also be adapted to provide for dynamic parsing. In output.c, the parser states represented in the "parser" array (see the description of mkpars.c above) are converted into two two-dimensional arrays "froms" and "tos". Both arrays can be indexed by the state, and for each state "i", froms[i] holds an array of valid shift tokens, and tos[i] holds the corresponding array of parser states into which to shift. A similar arrangement can be made for reduce actions. Later, "froms" and "tos" arrays can be fed into the table compression algorithm.

The initial parts of token_actions function can also be updated. As a first step to convert into "froms" and "tos" array representations, this function can build an intermediate array for each parser state called "actionrow". This intermediate array can be indexed by the token code ("symbol"). The intermediate array can contain the state to be shift to for each allowed token. It is at this point in the algorithm that TRANSFORM actions are added to the tables. A TRANSFORM action is represented as a SHIFT with a negative target state. In fact, the "target state" is really the context code to be passed to the transform function.

Before adding a SHIFT action to the actionrow, a check can be made as to whether the token to be shifted is a subtoken. If so, the position in the actionrow that corresponds to the parent token can be checked. Given that a conflict check has already been performed, only two cases are possible. Either there is no action at that position (indicated by a zero value), and in this case, the value can be set to the negated context number; or, the negated context value is already there, having been set by another subtoken of the same parent. In the latter case, the context is asserted to be the same. In addition, all error messages can be converted to the standard VS format, so that build.exe and related utilities recognize them as errors.

The LALR algorithm can be changed to check for TRANSFORM action before SHIFT. TRANSFORM can be recognized by the negative target state. If TRANSFORM is requested, the transform function can be called by passing it the current token and the context code. If the resulting token is unchanged (not transformed), a switch can be made to an error recovery mode. Otherwise, a standard SHIFT action can be performed with the new token code.

There are a couple of non-trivial issues related to this algorithm modification. For example, when a token is transformed, it is unclear whether it is necessary to check the token again for validity ("goto report_error" branch). At first it seems that the fact that the parent token was valid in that position, together with the fact that transform function was successful, are enough to be sure that the SHIFT action for subtoken will be present in this state. However, a validity check may be necessary. All subtokens will likely be valid in the "primary" parser state that the grammar author had in mind when writing the subtoken declaration. However, in a complex grammar, some subtokens may percolate as "valid" into some other states, and not all subtokens may change at the same time. It may be possible to have a state where some subtokens are valid and others are not.

For regular tokens, if it turns out that the SHIFT action does not exist in this particular state, a check is made for a REDUCE action. However, after a transform, this check is not performed for the transformed token. If there is no SHIFT action, the algorithm can go directly to the error reporting code, assuming there cannot be a REDUCE action for a subtoken. This assumption is believed to be correct, since the REDUCE action on a terminal symbol may only appear when that terminal is in the list of possible lookaheads. By removing all subtokens from the lookahead lists (see the discussion of lalr.c adaptation above), REDUCE actions are impossible for subtokens.

YACC typically generates the complete parser source, including tables, actions, and the runtime shift-reduce driver, in a single source (y.tab.c). There is also an option -r that instructs YACC to place the "switch" statement with the actions in a separate file y.code.c. Either way, the shift-reduce driver that performs the actual parsing is completely generated by YACC. This makes the driver code hard to change (it requires changing and rebuilding YACC). Changes to that code are usually needed, at the very least to make the code thread-safe.

For a dynamic parser, that arrangement can be changed. Output files y_jab.cpp (and, optionally, y_code.cpp—note slightly changed file names) can contain only tables and actions, correspondingly. The shift-reduce driver (lalr_driver.cpp) can be split into a separate source that is not generated. The driver can use #include to include y_jab.cpp and y_code.cpp. The latter two are not compiled into the parser directly, only as parts of lalr_driver.cpp.

Since lalr_driver is not generated, it may be modified easily, and all the necessary #include directives and declarations may be put directly into this source. Because of this, there is no need in the C code in the "definition section" and the "user subroutines section" in the dynamic parser generator grammar file. The dynamic parser generator can still allow these sections for compatibility with YACC, but all C code from these sections will be ignored. Temporary files used by the dynamic parser generated are created in the directory pointed to by the TEMP environment variable.

In lalr_driver.cpp file, the signatures of parse and lexer functions, yyparse and yylex, have been changed to take an extra parameter of type "CParser *". This parameter may be used to communicate between the parser, the lexer, and the rest of the program in a thread-safe way (without using globals variables). Also, yylex interface has been changed so that the resulting YYSTYPE structure can be returned via an out-parameter rather than a global variable.

Although it is recommended that actions in the grammar communicate only using local variables, sometimes it is desirable to use "globals" visible only to the parser actions. These "parser-only globals" should be declared as local variables of the parse function, yyparse, in lalr_driver.cpp.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 10:
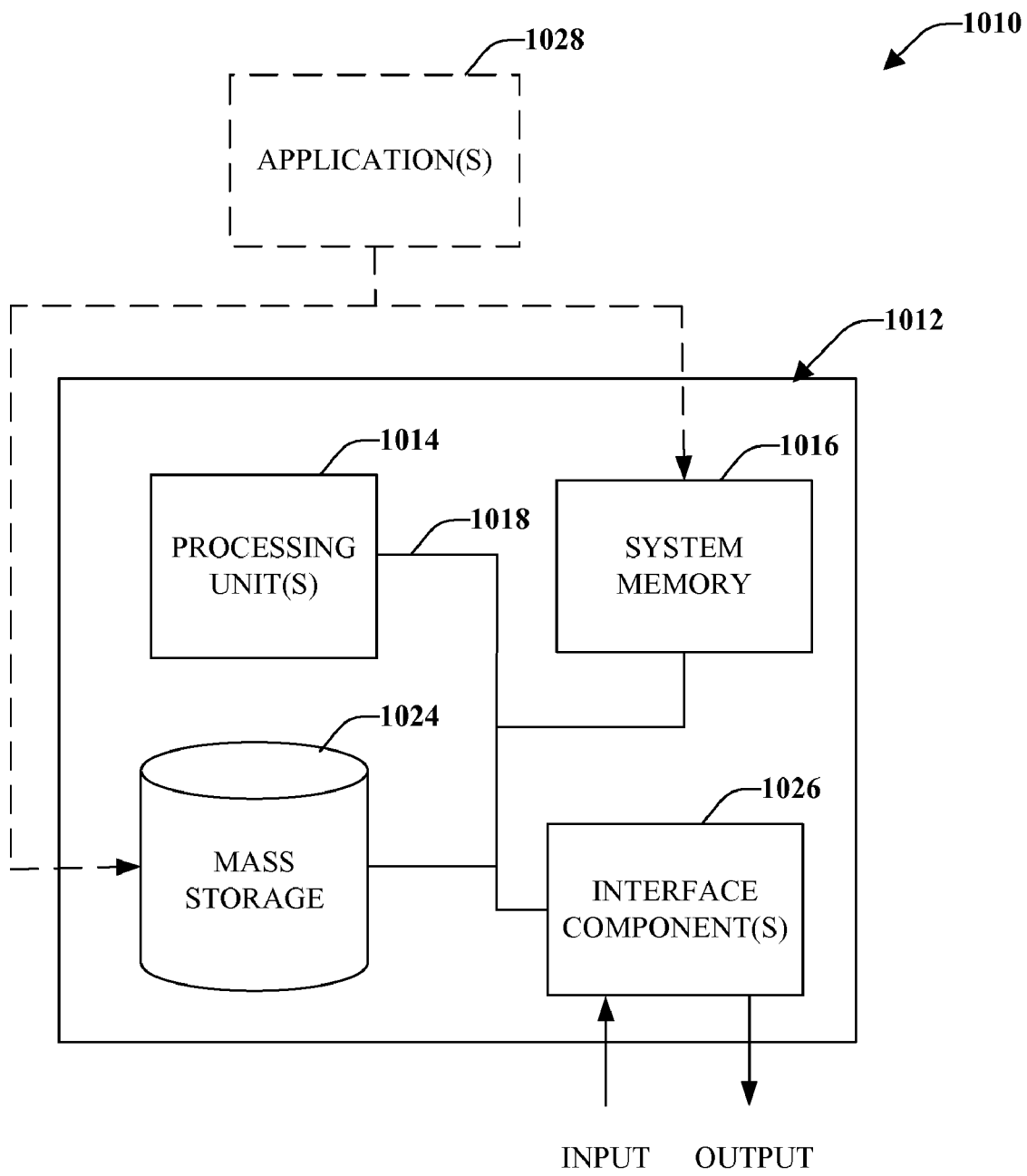
FIG. 10 is a schematic block diagram illustrating a suitable operating environment.
Figure 11:
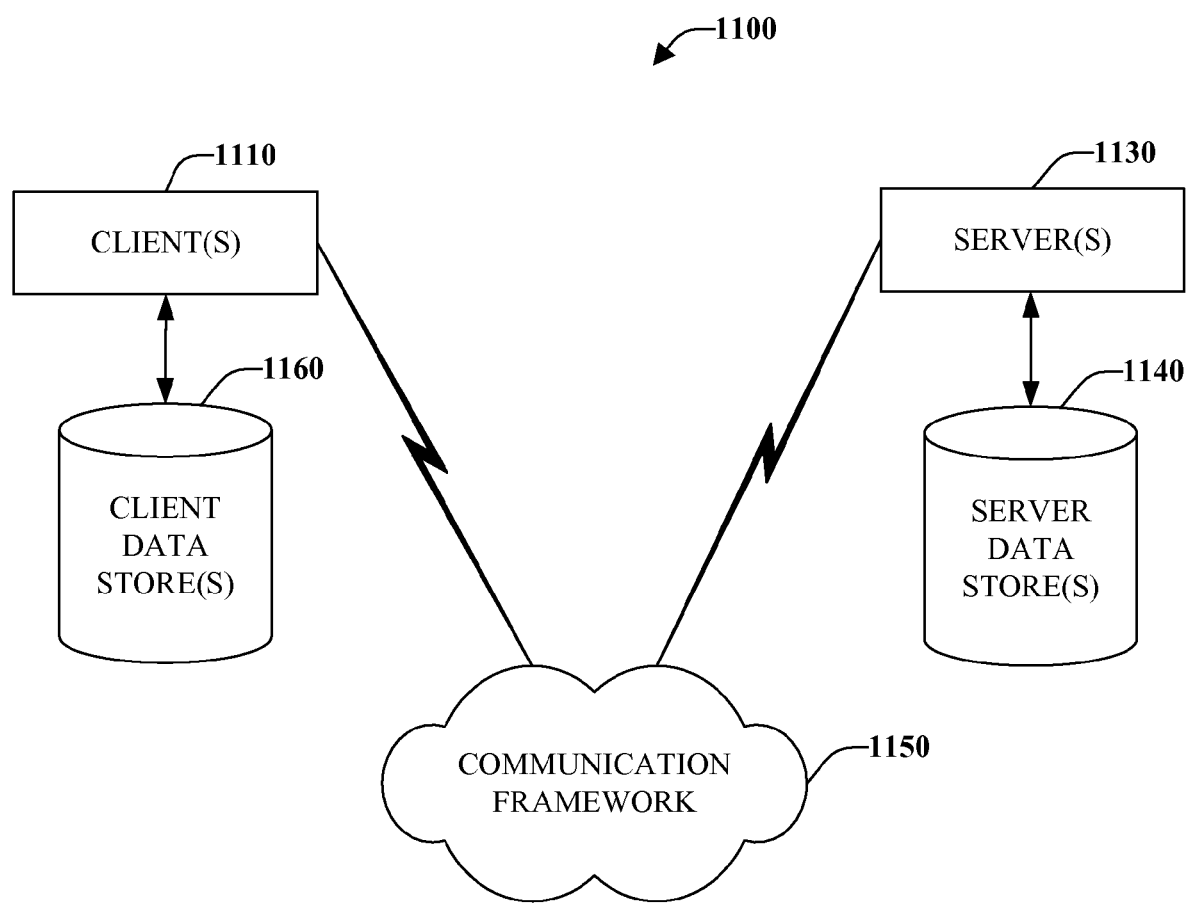
FIG. 11 is a schematic block diagram of a sample-computing environment

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject matter described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1024. Mass storage 1024 includes, but is not limited to, devices like a magnetic or optical disk drive, floppy disk drive, flash memory or memory stick. In addition, mass storage 1024 can include storage media separately or in combination with other storage media.

FIG. 10 provides software application(s) 1028 that act as an intermediary between users and/or other computers and the basic computer resources described in suitable operating environment 1010. Such software application(s) 1028 include one or both of system and application software. System software can include an operating system, which can be stored on mass storage 1024, that acts to control and allocate resources of the computer system 1012. In particular, operating system can include diagnostic components capable of monitoring and averting failure of a hard disk drive. Application software takes advantage of the management of resources by system software through program modules and data stored on either or both of system memory 1016 and mass storage 1024.

The computer 1012 also includes one or more interface components 1026 that are communicatively coupled to the bus 1018 and facilitate interaction with the computer 1012. By way of example, the interface component 1026 can be a port (e.g., serial, parallel, PCMCIA, USB, FireWire . . . ) or an interface card (e.g., sound, video, network . . . ) or the like. The interface component 1026 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1012 to output device(s) via interface component 1026. Output devices can include displays (e.g., CRT, LCD, plasma . . . ), speakers, printers and other computers, among other things.

FIG. 11 is a schematic block diagram of a sample-computing environment 1100 with which the subject matter can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the aspects of the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130. Both the one or more client data store(s) 1160 and the one or more server data store(s) can utilize hard disk drives to maintain data. Both client(s) 1110 and server(s) 1130 can utilize a diagnostic component to prevent failure of data stores and mitigate loss of data.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for performing dynamic syntactic analysis, the method performed upon one or more computer processors, the method comprising:
    selecting a set of grammar rules, the set of grammar rules comprising declarations of one or more conditional tokens;
    evaluating a set of tokens according to the set of grammar rules;
    identifying a token of the set of tokens as a conditional token for transformation;
    managing transformation of the identified token;
    transforming the identified token at parse time by invoking an independent transform function that transforms the token to a subtoken associated with the identified token such that transformation of the token is a function of context for the token; and
    parsing the transformed token.

2. The method of claim 1, further comprising analyzing the transformed token as a function of a formal grammar.

3. The method of claim 2, the formal grammar includes a declaration that describes the transformation of the identified token.

4. The method of claim 2, further comprising generating an error that indicates nonconformance of the set of tokens with the formal grammar.

5. The method of claim 4, the analysis of the transformed token utilizes lookahead to evaluate compliance with a formal grammar.

6. The method of claim 1, further comprising generating an output data structure based at least in part upon the transformed token.

7. The method of claim 1, further comprising utilizing lexical analysis to obtain the set of tokens from input data.

8. A computer program product comprising one or more computer-readable devices having encoded therein computer executable instructions which, when executed upon one or more computer processors, perform the method of claim 1.

* * * * *